United States Patent Office 2,792,288
Patented May 14, 1957

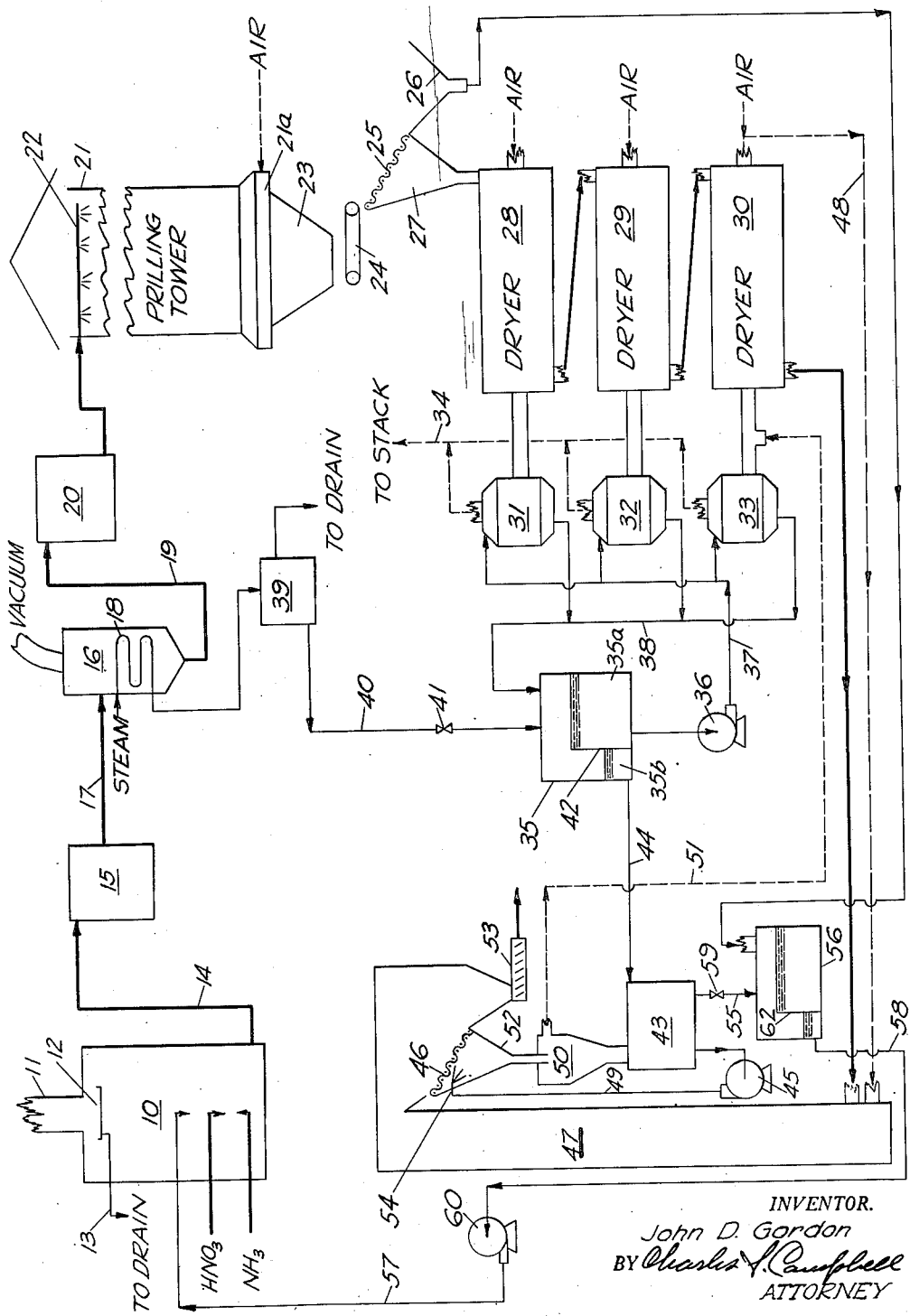

2,792,288

METHOD FOR PRODUCING GRANULAR SOLIDS

John D. Gordon, Anchorage, Ky., assignor, by mesne assignments, to National Cylinder Gas Company, Chicago, Ill., a corporation of Delaware Application September 15, 1952, Serial No. 309,679

3 Claims. (Cl. 23—302)

This invention relates to a process and apparatus for producing solid materials in granular form by cooling and solidifying droplets of a very concentrated solution of the solid and thereafter drying the solidified droplets to form the desired granules. More particularly, the invention is directed to an improved process and apparatus which provides for continuous and efficient recovery of off-size particles of the solid and the return of the solid so recovered to the process.

As will be apparent from the following explanation of the invention, the process and apparatus described herein may be employed in the production of a variety of "prillable" inorganic and organic materials (i. e., materials capable of being formed into spherical granules by the cooling and solidification of droplets of concentrated solutions of the material). Examples of materials of this type are ammonium nitrate, ammonium sulphate, sodium nitrate, and urea. However, for the purpose of illustrating the present invention, the process and apparatus of the invention are described hereinafter with reference particularly to their use for producing ammonium nitrate granules.

In the production of granular ammonium nitrate it has been the practice first to react ammonia vapor with concentrated nitric acid to form a solution of the salt. The solution is then concentrated by evaporation to a salt content of from about 95% to about 97%, and the hot concentrated solution is sprayed into a stream of cool air. The droplets of solution resulting from the spraying operation solidify during contact with the cool air to form generally spherical globules commonly referred to as prills. The size of the prills so formed varies over a considerable range depending on the conditions under which this step is carried out.

Substantially no evaporation of water from the droplets of solution and the resulting prills takes place during the cooling operation, and although the exteriors of the prills after cooling are relatively hard, the interiors remain warm and moist. In order to overcome this condition and thereby to stabilize the prills for packaging, shipment and handling in use, it has been the general practice to pass the prills in contact with dry, heated air. In this drying operation sufficient moisture is removed from the prills to cause them to harden completely, and to reduce their tendency to adhere to each other with the formation of undesirable lumps in the product. However, because of unavoidable disintegration of the prills during drying, substantial numbers of fine particles of ammonium nitrate are formed. Some of these fines are carried from the driers in the streams of drying air and the rest remain mixed with the prills of the desired size range.

In some cases it has been the practice to remove as much as possible of the fines from the air streams by various methods such as, for example, by the use of cyclone separators, and, in addition, it has been suggested that the fines be separated from the prills before bagging, or otherwise packaging for shipment, by a screening or classification step. However, prior to the present invention, an effective process or system for continuously and efficiently returning the fines so recovered to the process for conversion into prills of the desired size has not been suggested.

As has been noted above, the size of the prills produced during the cooling and solidification of the concentrated ammonium nitrate solution tends to vary widely. Despite the utmost care and skill which has been demanded in the past of those responsible for carrying out this particular phase of the process, it has been impossible to avoid the formation of substantial quantities of lumps or granules of larger than the desired size range. The presence of these over-size particles in the material passing to the drying operation in the process as practiced heretofore has further aggravated the problem created by the undesirable production of fines during the drying operation, because it has been necessary to extend the drying operation to completely dry the larger particles (thus increasing the extent of the disintegration of the granules).

It is, therefore, an object of the present invention to provide a continuous process for producing granules of soluble materials of commercially useful size in which the salt losses are reduced to a minimum by providing for efficient continuous recovery of all over-size and under-size particles at various points in the system where losses represented by such off-size particles tend to occur.

A further and related object, as applied particularly to the production of ammonium nitrate granules, is to provide a system amenable to continuous operation and automatic control wherein a high degree of thermal efficiency is achieved by virtue of the fact that the off-size product is picked up by solutions of varying concentrations in order to achieve, after the final pickup, a relatively strong liquor which may be returned, without concentration, to the main process stream ahead of the solution concentration step, preferably directly into the zone of reaction between the ammonia and nitric acid.

In the process and apparatus of the present invention, as applied particularly to production of ammonium nitrate granules, provision is made at two points for the classification of the granules. The first or primary classification is carried out as the ammonium nitrate granules emerge from the step in which the concentrated solution is solidified by a stream of cooling air. At this point over-size particles are removed before the granules proceed to the drying step. A secondary classification is accomplished after the drying operation and before the granules or prills are bagged or otherwise packed in containers. At this second point all of the fines which are not carried off by the stream of drying air are separated from the prills of the desired size.

An important feature of this invention is the use of the condensate from the heating steam employed in concentrating the ammonium nitrate solution as the wash water for dissolving and recovering off-size ammonium nitrate particles, thereby reducing the possibility of contaminating the product with organic and mineral impurities which are found in many natural waters. It has been discovered that the elimination of such impurities produces a more chemically stable product less subject to explosive decomposition.

In the preferred embodiment, the condensate is first circulated in a closed circuit which includes a zone in which ammonium nitrate fines are scrubbed from the air emerging from the dryers. From this circuit, in which the salt concentration is maintained at relatively low level, a portion of the solution is continuously diverted to a second circuit in which the salt concentration is further increased by the dissolving of the fines separated from the ammonium nitrate granules in the secondary classification step referred to above. A stream of solution from the second circuit flows continuously to a zone in which the over-size particles and lumps separated in the primary classification step are dissolved. From this zone the solution is continuously returned to a point in the system ahead of that in which the concentration step is accomplished, preferably into the reaction chamber in which the ammonia is reacted with the nitric acid. The salt concentration of the solution after the lumps and over-size particles have been dissolved therein should be at a very high level consistent with adequate rate solution of the lumps and satisfactory pumpability.

A still further important feature of the process and apparatus of this invention is that provision is made for drying the granules or prills in three separate steps utilizing drying air streams having different temperatures and humidities, for more efficient drying and cooling of the product. The drying air also is circulated through other solid handling portions of the system in order to prevent moisture pick-up after drying. As mentioned above, provision is also made for washing all of the air from the drying steps, thereby to avoid product loss.

Other objects, advantages and characteristics of this invention will become apparent to those familiar with the art upon reading the following detailed description in conjunction with the drawing and the appended claims.

The accompanying drawing illustrates a preferred form of apparatus or system for carrying out my improved process as applied to ammonium nitrate and is in the form of a flow diagram in which the various elements of the apparatus are shown schematically and are connected by lines indicating process piping for liquids and gases as well as lines representing the flow of solid materials. For convenience in understanding the drawing, conduits for flow of air are shown as broken lines, while conduits for the primary process flow of both solution and solids are shown as heavy lines. The various conduits of the recovery system for conveying solids and solutions are shown in lighter lines.

For convenience in understanding the invention both the process and the preferred apparatus for carrying out the process will be described concurrently.

Ammonia vapor and a concentrated solution of nitric acid containing about 55% acid are supplied to a neutralizing chamber 10 in combining proportions where they react in a well known manner at a temperature of approximately 255° F. to form ammonium nitrate solution. At this relatively high temperature considerable water is evaporated in the form of steam, a part of which condenses in the stack 11 of the neutralizer 10. A drip pan 12 mounted within the neutralizer beneath the stack 11 is connected by a drain line 13 to carry water condensing in the stack to a sewer, not shown. A line 14 conducts the salt solution formed in the neutralizer to an evaporator feed tank 15, which supplies a vacuum evaporator 16 by means of feed line 17. The solution leaving the neutralizer preferably contains about 85% ammonium nitrate.

To prepare this solution for the prilling operation, it is concentrated in the vacuum evaporator which is heated by steam supplied to a coil 18. The solution is evaporated under vacuum to a concentration of approximately 95 to 97%. The resulting strong liquor at a temperature of about 280° F. leaves the evaporator through a conduit 19 and is retained in a strong liquor tank 20. This liquor is sprayed into the top of prilling tower 21 by means of header 22 disposed near the top of the tower. Cooling air is supplied at the bottom of the prilling tower through an annular bustle or plenum chamber as shown at 21a. As the droplets of strong solution fall through the upwardly flowing cooling air stream their temperature is lowered causing solidification of the liquid droplets into granules. Very little drying occurs in the prilling tower, and the prills or granules emerge at the bottom of the tower at a temperature of approximately 165° to 170° F. and containing approximately 3% moisture.

The flow rate of the primary cooling air may be varied depending upon its temperature. It has been found that under winter conditions, when the air is relatively cold, no velocity other than that resulting from natural convection is required.

The lower section of the prilling tower is generally conical in shape and the open bottom of the cone 23 is directly above a continuous belt conveyor 24 which serves to transfer the prills from below the cone to a primary classifying screen 25. This screen, which may be provided with a conventional vibrator, serves to remove over-size granules or lumps from the stream of product. The over-size lumps pass over the screen and fall into hopper 26 from which they are conveyed directly to a lump dissolving tank 56, the function of which will be described later. The product stream, still containing under-size particles or fines, falls directly through a hopper 27 into the first dryer unit 28. This dryer may be conventional in construction and preferably consists of a rotatable horizontal drum provided with an inlet for drying air at one end, and an outlet for the air at the opposite end thereof. As shown in the drawing, the moist granules of ammonium nitrate pass through the dryer in parallel flow with the drying air. The drying air enters the dryer at a temperature of approximately 195° F. and emerges at a temperature of about 155° F. The moisture content of the prills is reduced from about 3% to about 1.5% during passage through this first dryer.

From the first dryer, the granules or prills pass to a second dryer 29 which may be identical in construction to the first dryer. Air is supplied to the second dryer at a temperature of about 290° F. and leaves the dryer at a temperature of about 160° F. In this stage of drying the moisture content of the prills is further reduced to approximately 0.5%. Final drying of the prills is accomplished in a third dryer 30 which is of essentially the same construction as the other two dryers. The function of the third dryer is primarily to cool the prills. In addition, their moisture content is reduced to approximately 0.3% in this unit. The air entering the third dryer is first conditioned by refrigeration to lower its dew point to about 50° F. After refrigeration, the air is reheated, preferably to a temperature of about 95° F. The air leaving the third dryer has a temperature of about 125° F.

The cooling effect realized in the vaporization of ammonia prior to the reaction between gaseous ammonia and nitric acid may be utilized, by employment of suitable heat exchange means (not shown), to reduce the temperature and lower the dew point of the air supplied to the third dryer.

As indicated previously, the product passing to the dryers contains a small amount of fines. Further fines are developed as a result of the disintegration of the prills incident to their movement through the dryers. A certain amount of these fines is entrained in the secondary air streams passing through the dryers, and, to recover these entrained fines, the air outlets of the dryers 28, 29, and 30 may be connected to separate air scrubbing units 31, 32 and 33, respectively. The washed air leaving the scrubbers passes through a duct 34 leading to a stack vented to the atmosphere. A preferred type of scrubbing unit is sold under the trade name "Rotoclone" and comprises a rotor over which the air passes, and means for spraying wash liquid upon the moving rotor in such a manner as to afford intimate contact of the air with the wash liquid.

The wash solution for the scrubbing units is continuously supplied from surge tank 35 by means of pump 36 and conduit 37 which has branch connections leading therefrom to the several scrubbing units. In the scrubbing units the wash solution is brought into intimate contact with the air streams from the dryers, thereby dissolving and removing the entrained ammonium nitrate fines from the air. The scrubbing units are provided with liquid outlet connections leading to conduit 38 by means of which the wash solution is returned to the surge tank. As shown schematically in the drawing, the surge tank may be divided into two sections by a vertical baffle 42. The wash solution is pumped from the main section 35a of the tank to the scrubbing units and is returned therefrom to the same section of the tank. Thus, this section of the surge tank serves as a primary reservoir in the first or primary circuit off-size particle recovery system described herein.

Condensate from the steam-heating coil 18 in evaporator 16, which is collected in condensate receiver 39, is continuously admitted to the main section of the surge tank through conduit 40 at a rate determined by the setting of valve 41. It is thus obvious that wash solution will flow over the upper edge of the baffle 42 into the low level or outlet section 35b of the surge tank at a rate dependent on the rate at which the condensate is admitted to the main section. The rate of condensate supply to this primary wash circuit may be adjusted to maintain any desired concentration of ammonium nitrate in the wash solution. It is preferred to operate with a concentration in the circuit of not more than about 35% ammonium nitrate. Greater concentration than this is likely to result in precipitation of salt from the solution in the scrubbing units and connecting conduits. Such precipitation may occur because of evaporation of the wash solution in contact with the hot air in the scrubber units. Consequently, it is preferred to admit condensate to this primary recovery circuit at such rate as to maintain the solid concentration in the primary circuit below the aforesaid concentration. Thus the rate of overflow of the wash solution over the baffle 42 will be determined by the rate of supply of condensate and the rate of evaporation in the scrubbing units.

From the low level section of the surge tank the weak wash solution bled from the primary circuit as described above is conducted to a wash tank 43 by means of a conduit 44. The wash tank serves as a reservoir in the second recovery circuit in which water is circulated by means of a pump 45 to dissolve and recover fines which are separated from the prills by vibrating product screen 46 as will be described later.

The cooled, dried prills from the third dryer 30 pass directly to an elevator 47 which conveys the prills upwardly to a point above the vibrating screen 46. This screen serves to separate the fines produced in the drying stages from the prills of the desired size range. In order to prevent adhesion and lumping of the particles in the elevator 47 which might result from contact of the prills with moist air of the atmosphere, dry air is bled through a conduit 48 extending from the air inlet of the third drier unit 30 into the base of the elevator housing. This air passes upwardly through the elevator, downwardly through the vibrating screen 46 and hoppers 52 and 50, and thence back to the air outlet of the drier unit 30 through conduit 51. From this point the air passes to the scrubbing unit 33 along with the air from the dryer unit 30 so that any fines which are picked up by the air in the elevator and hoppers are dissolved and recovered by the wash solution in the primary recovery circuit. As described above, the primary recovery circuit includes surge tank 35, pump 36, conduit 37, air scrubbing units 31, 32 and 33, and conduit 38 for returning wash solution from the scrubbing units to the surge tank.

As shown in the drawing, the vibrating screen 46 is superimposed above a hopper 52 which feeds directly into hopper 50. The hopper 50 in turn discharges directly into wash tank 43 mentioned above. The ammonium nitrate granules are deposited from the top of the elevator onto the vibrating screen, the fines dropping through the screen into the hopper 52, and the granules of the desired size passing off the screen to screw conveyor 53. This conveyor carries the dried, sized granules to further operations preparatory to bagging or other packaging, which constitute no part of the present invention.

The fines which pass through the screen 46 are dissolved in wash solution which is continuously circulated in a secondary recovery circuit including wash tank 43, pump 45, conduit 49, distributor head 54, and hoppers 52 and 50. The pump 45 supplies a continuous flow of solution from the wash tank 43 to the spray head 54 which is arranged to direct a spray of the wash solution downwardly beneath the screen 46. The spray picks up fines which have passed through the screen, and the solution collected in the hopper 52 conveys these fines downwardly through the hopper 50 into the wash tank 43. Solution of the fines is completed either during downward passage through the hoppers or in the wash tank. It should be mentioned at this point that the above-described flow of dry air through the screen 46, prevents moisture from the spray from travelling upwardly into the screening zone which might result in clogging of the screen.

Wash solution may be continuously bled from the secondary recovery circuit by means of conduit 55 connecting wash tank 43 with lump-dissolving tank 56. It is noted that at this point the solution in wash tank 43 is of a higher concentration than the solution which is continuously bled from the surge tank 35 to the wash tank through line 44, to the extent of the quantity of ammonium nitrate in the fines which pass through the screen 46. In normal operation the concentration of the wash solution in the secondary circuit is about 45% ammonium nitrate.

As has been previously mentioned, a screen, 25, is provided at the lower end of the prilling tower 21 for separation of oversize lumps from the ammonium nitrate granules passing to the driers 28, 29 and 30. In the system of the present invention, these oversize particles are dissolved in wash solution bled from a convenient point in the secondary recovery circuit described above. An arrangement which may be used for this purpose is shown in the drawing and includes a lump-dissolving tank 56 adapted to receive from hopper 26 the oversize solids removed in the primary classification step. Wash solution is supplied to this tank by means of conduit 55 which connects the wash tank 43 with the lump-dissolving tank and is provided with a control valve 59. Thus, wash soltuion may be bled to the lump-dissolving tank continuously at a rate determined by the setting of valve 59. Another arrangement which has been successfully employed involves conducting a portion of the wash solution collected in hopper 50 directly to the lump-dissolving tank, the balance of the solution so collected in the hopper 50 being conducted to wash tank 43 for circulation in the secondary recovery circuit as previously described.

It will be realized that the solid ammonium nitrate supplied to the lump-dissolving tank may be somewhat difficult to dissolve by reason of the fact that the solution in the tank at this point is relatively concentrated and the ammonium nitrate may be in the form of relatively large particles. Accordingly, it may be desirable to provide the lump tank with an agitator and means for heating the solution (not shown).

The lump tank 56 is preferably provided with a baffle 62 as shown in the drawing to insure against solids being drawn into the outlet line 58 from the tank. The enriched liquor solution is pumped from the lump tank through conduits 58 and 57 by means of pump 60 and is introduced into the neutralizer 10 where the ammonia and nitric acid are combined. The introduction of the concentrated salt solution into the neutralizer provides a measure of temperature control in that unit by compensating for the heat given off during the neutralization reaction.

In normal operation the solids concentration of the solution from the lump tank 56 will be in the neighborhood of 55%. However, during periods when large amounts of lumps are dissolved, for example, when the conical bottom 23 of the prilling tower is given a periodic cleaning, this concentration may run as high as 70%. Consequently it may prove desirable to provide steam traced piping from the lump dissolving tank to the neutralizer in order to avoid freezing of the solution in the conduits 57 and 58.

If a market exists for oversize lump material, the oversize lumps from screen 25 of the primary classification may be bagged and sold rather than redissolved. If this is done the lump tank 56 may of course be eliminated and the solution bled from the wash tank 43 may be piped directly to the neutralizer 10.

As will be appreciated from the foregoing description an improved process and apparatus has been provided for producing a purer product consisting of uniformly-sized granules and characterized by the fact that all off-sized particles are recovered by dissolving in condensate from heating steam which is essential in the main process. In addition, the over-all process results in virtually no losses of product and is highly efficient from a thermal standpoint, because a minimum amount of water is employed in the recovery system. The use of small amounts of water which is made possible by the invention herein described obviates the necessity for evaporating large quantities of water from the recovery system preliminary to the prilling operation.

Various changes or modifications in the process and system of this invention in addition to those set forth herein may be made without departing from the spirit of this invention, the scope of which is intended to be commensurate with the following claims.

What is claimed is:

1. In the process of forming uniformly-sized prills of ammonium nitrate by reacting ammonia and nitric acid in aqueous solution, concentrating the resultant ammonium nitrate solution by evaporation, the latent heat for such evaporation being obtained from condensing steam, cooling and solidifying the concentrated solution by spraying droplets thereof in a primary stream of air to form prills, drying the prills by means of a secondary air stream, and classifying the prills as to size; the improvement which comprises conducting a primary classification of the prills after solidification to separate oversize lumps and prills from prills of the desired size and a secondary classification after the drying step to separate undersize particles from desired-size prills, utilizing condensed heating steam from the solution evaporating step to supply pure water to a primary recovery circuit in which wash liquor is continuously recirculated in contact with spent air from the drying step to remove entrained ammonium nitrate particles therefrom, diverting wash liquor from said primary recovery circuit to a secondary recovery circuit in which a closed circuit flow is maintained to dissolve undersize particles from the secondary classification, diverting wash liquor from said secondary recovery circuit and utilizing said last-mentioned wash liquor to dissolve oversize lumps and prills from said primary classification step, and then returning enriched liquor from the preceding step to the process at the point at which the reaction between ammonia and nitric acid occurs to return the otherwise lost product to the process and to control the neutralization temperature.

2. In the process of forming uniformly-sized prills of ammonium nitrate by reacting ammonia and nitric acid in aqueous solution, concentrating the resultant ammonium nitrate solution by evaporation, the latent heat for such evaporation being obtained from condensing steam, cooling and solidifying the concentrated solution by spraying droplets thereof in a primary stream of air to form prills, drying the prills by means of a secondary air stream, and classifying the prills as to size; the improvement which comprises conducting a primary classification of the prills after solidification to separate oversize lumps and prills from prills of the desired size and a secondary classification after the drying step to separate undersize particles from desired-size prills, utilizing condensed heating steam from the solution evaporating step to supply pure water to a primary recovery circuit in which wash liquor is continuously recirculated in contact with spent air from the drying step to remove entrained ammonium nitrate particles therefrom, diverting wash liquor from said primary recovery circuit to a secondary recovery circuit in which a closed circuit flow is maintained to dissolve undersize particles from the secondary classification, diverting wash liquor from said secondary recovery circuit, and utilizing said last-mentioned wash liquor to dissolve oversize lumps and prills from said primary classification step, and then returning enriched liquor from the preceding step to the main process stream ahead of the solution concentration step.

3. In a process for producing uniformly sized prills of very soluble solid material by evaporating a solution of the soluble material to form a highly concentrated solution, cooling and solidifying droplets of the highly concentrated solution to form prills, and drying the prills in a hot air stream; the improvement which comprises scrubbing the hot air stream which has dried the prills to remove entrained particles and form a dilute solution of the soluble material, enriching the dilute solution by dissolving therein sufficient undersize particles separated from the prills to raise its concentration to an intermediate level, further enriching the intermediate concentration solution by dissolving therein sufficient oversize particles separated from the prills to raise the concentration from said intermediate level to a higher level at which it may be economically reintroduced into the main process stream ahead of the evaporation step, reintroducing the thus concentrated solution to the main process stream ahead of said evaporation step, and obtaining the off-size particles for the enrichment of the solutions by screening the prills before drying to separate oversize particles and after drying to separate undersize particles from prills of the desired size.

References Cited in the file of this patent

UNITED STATES PATENTS

| | | |
|---|---|---|
| 314,137 | Kennedy | Mar. 17, 1885 |
| 339,723 | Winkler | Apr. 13, 1886 |
| 661,996 | Jordan | Nov. 20, 1900 |
| 1,103,167 | Wood | July 14, 1914 |
| 1,432,866 | Kazienke | Oct. 24, 1922 |
| 1,613,334 | Symmes | Jan. 4, 1927 |
| 2,138,810 | Wood | Nov. 29, 1938 |
| 2,402,192 | Williams et al. | June 18, 1946 |
| 2,528,407 | Yeandle | Oct. 31, 1950 |
| 2,619,405 | Greer et al. | Nov. 25, 1952 |
| 2,631,084 | Robinson | Mar. 10, 1953 |
| 2,653,391 | Edmunds | Sept. 29, 1953 |

OTHER REFERENCES

Perry: "Chemical Engineers Handbook," published by McGraw-Hill Book Co., New York, third edition, 1950, pages 1039, 1213, 1215 and 1217.